United States Patent
Jaladi et al.

(10) Patent No.: US 11,356,518 B2
(45) Date of Patent: *Jun. 7, 2022

(54) MOBILE DEVICE TRANSACTION AUTHENTICATION APPLICATION REDIRECTION SYSTEM

(71) Applicant: PayPal, Inc., San Jose, CA (US)

(72) Inventors: Kishore Jaladi, San Jose, CA (US); Darshan Desai, San Jose, CA (US); Abhishek Chhibber, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,054

(22) Filed: Jun. 9, 2020

(65) Prior Publication Data

US 2020/0396300 A1 Dec. 17, 2020

Related U.S. Application Data

(63) Continuation of application No. 15/289,543, filed on Oct. 10, 2016, now Pat. No. 10,681,149.

(51) Int. Cl.
*H04L 67/148* (2022.01)
*G06Q 20/32* (2012.01)
(Continued)

(52) U.S. Cl.
CPC ......... *H04L 67/148* (2013.01); *G06Q 20/322* (2013.01); *G06Q 20/3224* (2013.01);
(Continued)

(58) Field of Classification Search
CPC ... H04L 63/0815; H04L 63/08; H04L 67/148; G06F 21/41; G06F 21/31; G06F 21/34
See application file for complete search history.

(56) References Cited

U.S. PATENT DOCUMENTS 7,950,026 B1    5/2011   Urbach
2012/0324556 A1*  12/2012   Yefimov ............... H04L 9/3234
726/7
(Continued)

OTHER PUBLICATIONS

Apple Inc. "Apple Pay on the Web—WWDC 2016—Videos." Apple Developer, Jun. 17, 2016, https://developer.apple.com/videos/play/wwdc2016/703/ (Year: 2016).*
(Continued)

*Primary Examiner* — Austin J Moreau
(74) *Attorney, Agent, or Firm* — Haynes and Boone, LLP

(57) ABSTRACT

Systems and methods for redirecting control of a process performed on a browser application on a user device accessing a web application to a native application on the user device include receiving, through a web application controlling a process, a request to perform an action (e.g., user authentication). A determination is made whether the request identifies a native application feature for completing the action that is preferable over a web application feature for completing the same action. In response to the action being determined to be completed by a native application feature, a determination is then made as to whether the native application feature is enabled by the native application. In response to determining the native application feature is enabled, control of the process is redirected from the web (Continued)

application to the native application such that the native application completes the action using the native application feature.

20 Claims, 13 Drawing Sheets

(51) Int. Cl.
  *G06Q 30/06* (2012.01)
  *H04L 67/02* (2022.01)
  *H04L 9/40* (2022.01)
(52) U.S. Cl.
  CPC ......... *G06Q 30/0641* (2013.01); *H04L 67/02* (2013.01); *H04L 63/08* (2013.01)

(56) References Cited

U.S. PATENT DOCUMENTS

2014/0063344 A1 3/2014 Dureau
2017/0085563 A1* 3/2017 Royyuru ............ G06Q 20/3223
2017/0192766 A1 7/2017 Sogani et al.
2019/0325445 A1* 10/2019 Anderson .......... G06Q 20/0855

OTHER PUBLICATIONS

"APages. Search Programming Guide: SuPages.ort Universal Links-SuPages.ort Universal Link," 2016, 3 Pages, APages.le Inc., Retrieved from the Internet: URL: https://developer.aPages.le.com/library/conten/documentation/general/conceptual/aPages.search/universallinks.html, 3 Pages.
Apple Inc., "Apple Pay on the Web—WWDC 2016—Videos", Apple Developer, Retrieved from the Internet: URL: https://developer.apple.com/videos/play/wwdc2016/703, Jun. 17, 2016, 27 pages.
"SF Safari View Controller—SafariServices I APages.le Developer Documentation: SFSafariViewController—An Object That Provides a Standard Interface for Browsing the Web", API Reference , Retrieved from: https://developer.aPages.le.com/reference/safarisaervices/sfsafariviewcontroller, 2 Pages.
International Appl. No. PCT/US2017/054114, PCT International Search Report and Written Opinion dated Dec. 15, 2017, 7 pages.

* cited by examiner

MOBILE DEVICE TRANSACTION AUTHENTICATION APPLICATION REDIRECTION SYSTEM

CROSS REFERENCE TO RELATED APPLICATIONS

The present application is a Continuation of U.S. patent application Ser. No. 15/289,543, filed Oct. 10, 2016, the disclosure of which is incorporated herein by reference in its entirety.

BACKGROUND

Field of the Disclosure

The present disclosure generally relates to applications accessible via mobile devices, and more particularly to a system that provides for the redirection of control of a process between a web application and a native application.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

When purchasing products and services through a merchant website presented through a browser application, a user may select a link to complete payment using a payment service provider. The link may include a uniform resource locator (URL) that accesses the payment service provider's website that provides a web application to complete the transaction, which typically requires some form of user authentication to access the user's payment service provider account. User authentication may require the user to input credentials (e.g., a username and a password) to gain access to the user's payment service provider account to complete the payment, which can be a relatively time consuming and cumbersome task, particularly on mobile devices that have small touchscreen keyboards. However, in scenarios where a user is purchasing products and services using a mobile device, the mobile device may also include a native application that allows the user to access and/or communicate with the payment service provider in order to complete transactions. The native application may have different features (e.g. a biometric authentication feature vs. the user credential input feature discussed above) than the payment service provider's web application, which may provide benefits to the user of the mobile device in completing the transaction relative to the features available on the web application. Similarly, there may be instances where the web application may provide benefits to the user of the mobile device in performing functionality relative to the features available on the native application.

Thus, there is a need for the ability to redirect control of a process between a browser application presenting a web application and a native application.

Figure 1:
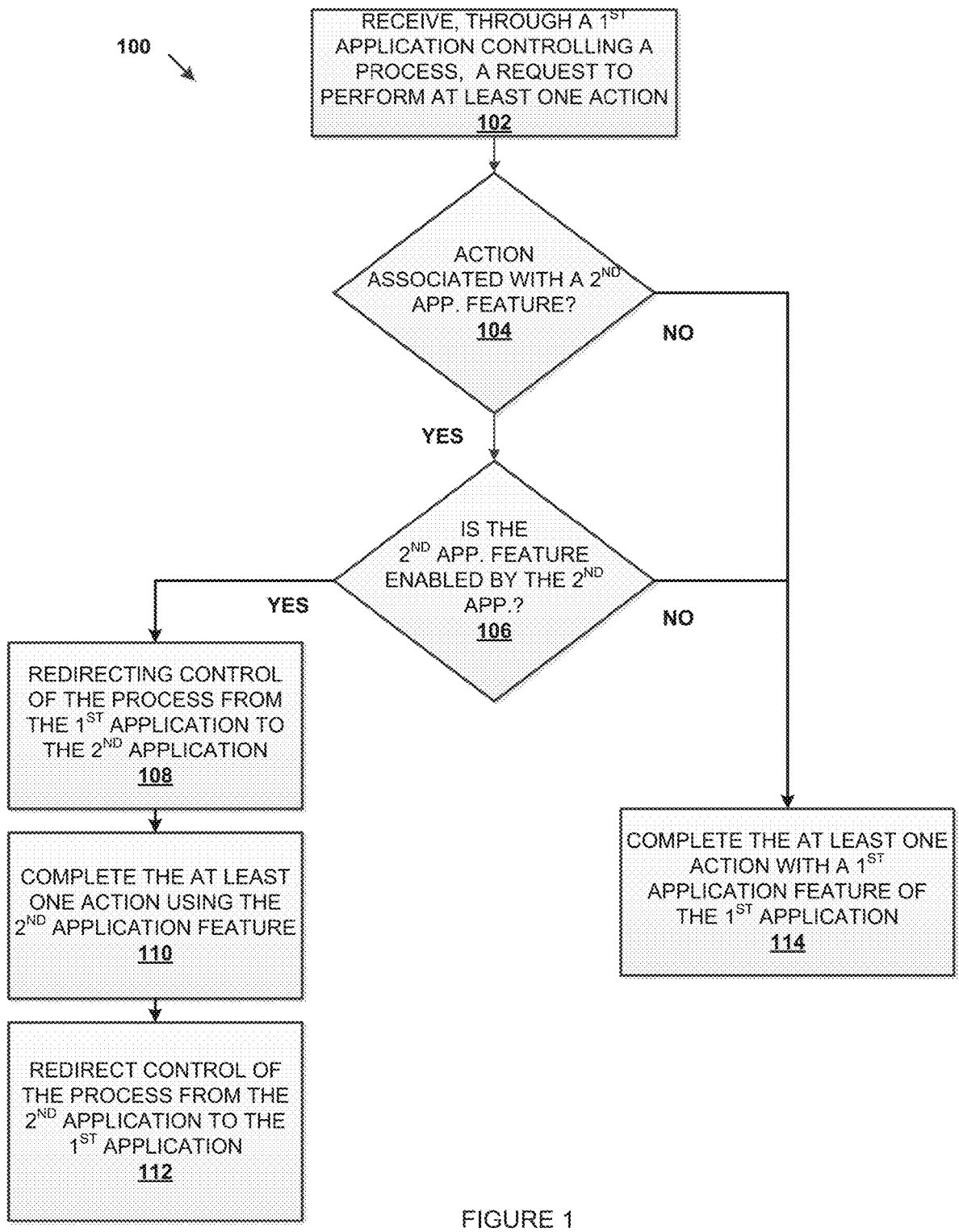
FIG. 1 is a flow chart illustrating an embodiment of a method for redirecting control of a process between a web application and a native application.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include application redirection systems and methods that may be used to, for example, redirect control of a process on a web application that is displayed through a browser application provided on a mobile device to a native application that is provided on the mobile device in order to complete an action of the process. As discussed above, a service provider's native application may provide different features to perform an action than are provided by the service provider's web application. In some situations, the native application features may be more user friendly, may better utilize capabilities of a type of user device for which they are programmed, and/or otherwise may be preferable to use over a corresponding web application feature that may complete the same action. Therefore, when a process is begun by a user on the web application provided via a browser application, it may be beneficial for the process to be redirected to the native application to complete one or more actions of the process. This may save time, enhance security, and/or provide a better overall user experience. The systems and methods of the present disclosure provide for seamless redirection of control of a process from a web application to a native application when, for example, an action that justifies the redirection is detected. The action of the process may be completed by the native application and, in some situations, control of the process may then be redirected back to the web application after the action is completed.

As discussed below, a user of a user device may access a website through a browser application (e.g., a web browser application, a network browser application, etc.) that may include a web application that allows the user to complete a process (e.g., purchasing goods and/or services at a merchant website, sending an email, accessing media content, and/or performing other processes that would be apparent to one skill in the art in possession of the present disclosure). The user may then proceed through the process by performing and/or requesting various actions (e.g., navigating through links, inputting data, requesting data, etc.) via the web application. As different actions in the process are performed, the systems and methods of the present disclosure may operate to determine whether an action or a request to complete an action identifies a native application feature that may be used to complete the action and whether that native application is enabled. For example, the web application may monitor an indicator database to identify actions that are preferably completed by the native application feature and, when such actions are identified, the web application may request an indicator from the browser application and determine whether the associated native application feature is enabled on the user device.

When the native application feature is enabled on the user device, the systems and methods of the present disclosure may redirect control of the process from the web application to the native application such that the native application completes the action using the native application feature. For example, an action requiring authentication may result in the process being redirected from the web application to the native application to complete the authentication with a native application authentication feature such as a finger print scanner (e.g., rather than completing the authentication with a web application authentication feature such as a username/password combination). Subsequently, the systems and methods of the present disclosure may operate to determine whether the action was completed using the native application, and redirect the process back to the web application to complete the process.

In one embodiment, the redirection may be enabled when the web application receives a request to perform an action that includes loading a web page based on a uniform resource locator (URL). The web application may generate a redirect URL (e.g., a 302 redirect) and provide the redirect URL to the user device such that a redirect engine receives the redirect URL. The redirect engine may then process the redirect URL and determine which native application on the user device to which control of the process should be redirected from the browser application. For example, the redirect engine may reference a native application association database and use the redirect URL to determine a native application identifier that is stored in the native application association database in association with that redirect URL. Using the native application identifier, the redirect engine may switch control of the process from the browser application to the native application that is associated with that native application identifier. The redirect engine may include a specific aspect of iOS® (e.g., Safari View Controller®) or Android® (e.g., Chrome Custom Tabs®) to open an empty iframe to visit a deep app link to the native application (e.g., Universal Links in iOS® and App Linking® in Android®).

Referring now to FIGS. 1, 2, 3, and 4, a method 100 for application redirection is illustrated that, in the embodiment discussed below, may be utilized for redirecting a process from a web application to a native application on a user device. However, the application redirection method is envisioned as providing benefits in redirecting control between any of a variety of different applications while remaining within the scope of the present disclosure.

In some embodiments of the method 100 described below, one or more system provider devices may operate to perform or enable the method 100. For example, a system provider may utilize system provider device(s) to provide user accounts to users and perform actions of a process executed on a web application and/or native application. In a specific example, a payment service provider such as, for example, PayPal, Inc. of San Jose, Calif., may utilize a payment service provider device to perform the method 100 discussed below, and in some embodiments may operate in cooperation with one or more other system providers (via their system provider devices) and/or users (via their user devices) to perform the method 100 discussed below. In other embodiments of the method 100 described below, one or more user devices may operate to perform or enable the method 100. In the examples discussed below, a user utilizes user device(s) to redirect control of a process from a web application accessed via a browser application on the user device to a native application on the user device. However, one of skill in the art in possession of the present disclosure will recognize that a wide variety of system providers and user devices may operate, alone or together, to provide the systems and methods discussed herein without departing from the scope of the present disclosure.

Figure 2:
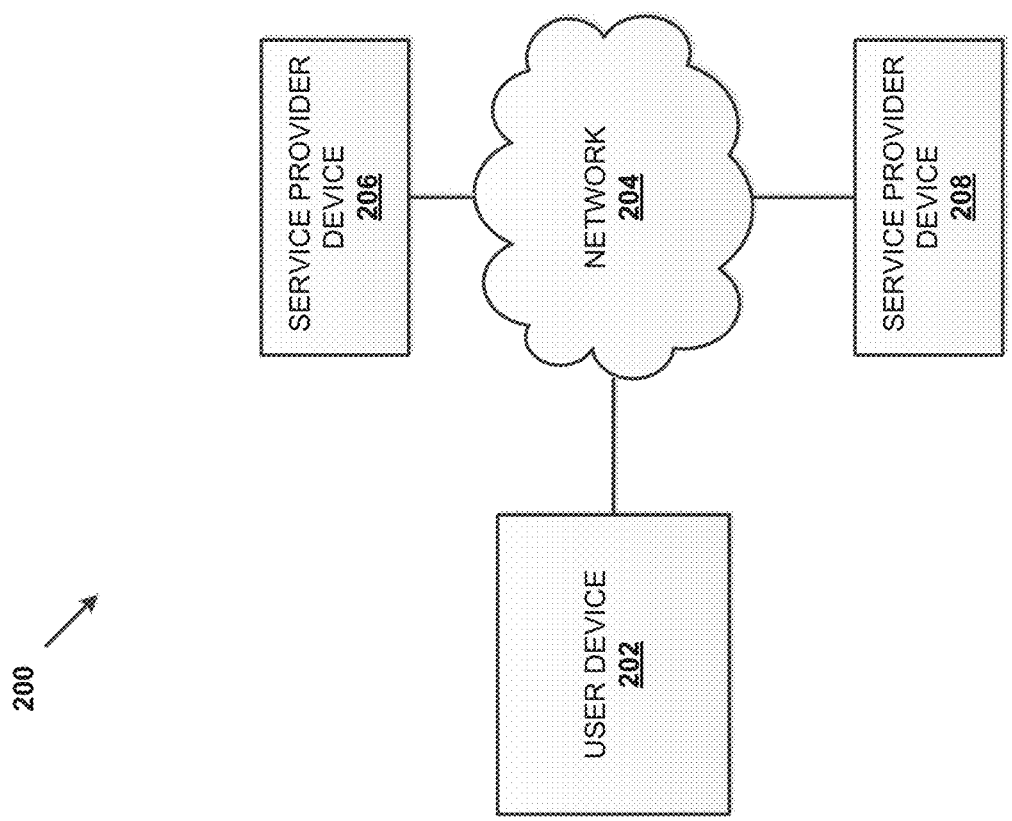
FIG. 2 is a schematic view illustrating an embodiment of an application redirection system.

Referring now to FIG. 2, an embodiment of an application redirection system 200 is illustrated and described briefly for reference in the method 100 discussed below. In an embodiment, the application redirection system 200 may include a user device 202 coupled to a network 204. Furthermore, the application redirection system 200 may include one or more service provider devices (e.g., the first service provider device 206 and the second service provider device 208 illustrated in FIG. 2) coupled to the network 204. In a specific example, the first service provider device 206 and/or the second service provider device 208 may belong to an on-line or mobile payment service provider such as, for example, PayPal, Inc. of San Jose, Calif. As described herein, the user device 202 may be configured to redirect control of a process between a web application hosted by the first service provider device 206 or the second service provider device 208 and a native application on the user device 202 when the user device 202 requests that at least one action be performed that may use a native application feature of a native application provided on the user device 202 (e.g., a native application created by the service provider for accessing the first service provider device 206 and/or the second service provider device 208.) While a specific example of the application redirection system 200 is illustrated, one of skill in the art in possession of the present disclosure will recognize that a wide variety of application redirection systems having various configurations of networks, user devices, and service provider devices that may operate to provide the systems and methods discussed herein without departing from the scope of the present disclosure.

Figure 3:
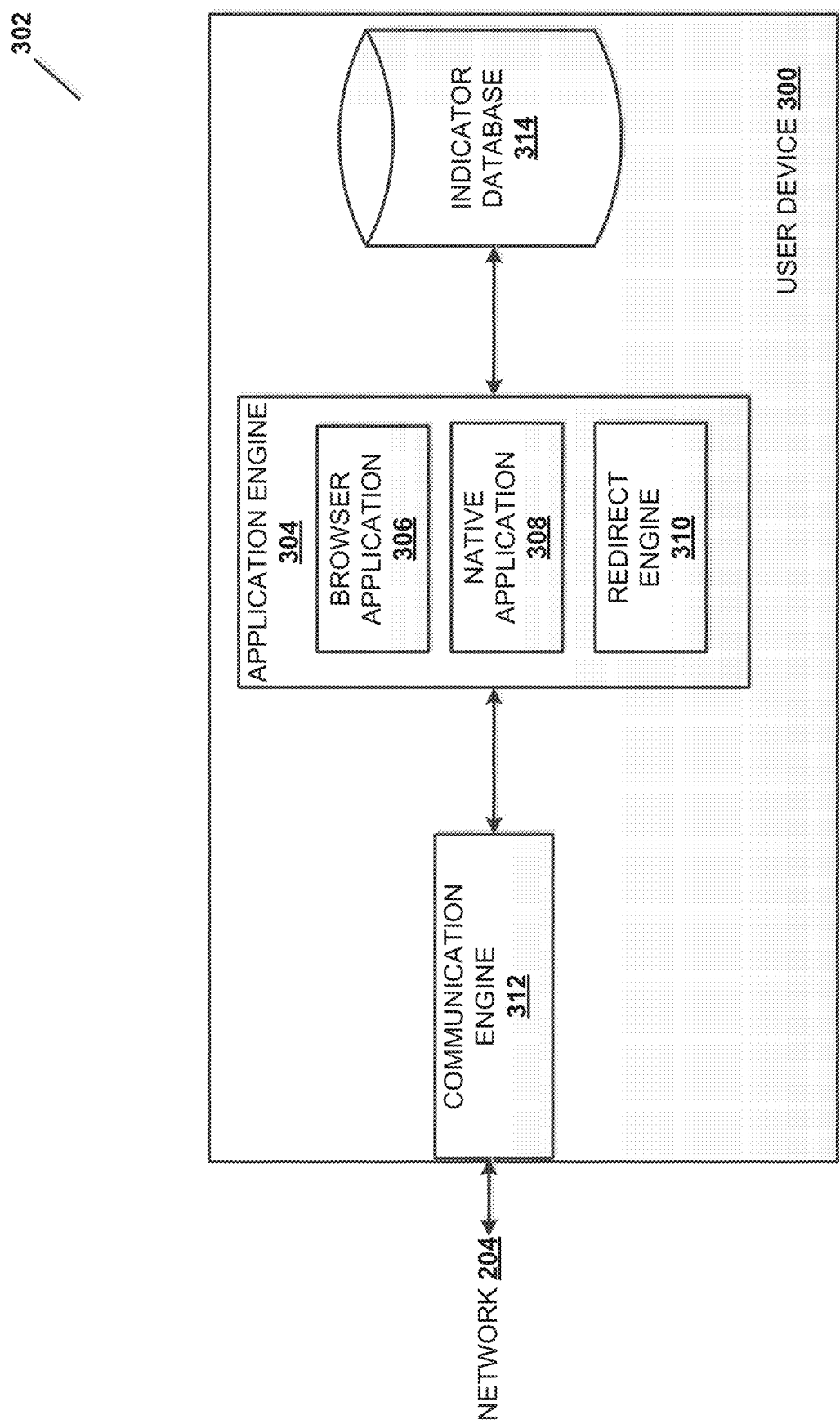
FIG. 3 is a schematic view illustrating an embodiment of a user device device used in the application redirection system of FIG. 2.

Referring now to FIG. 3, an embodiment of a user device 300 is illustrated that may be the user device 202 discussed above with reference to FIG. 2, and which may be provided by a desktop computing system, a laptop/notebook computing system, a tablet computing system, a mobile phone, a wearable device, and/or other user devices known in the art. However, one of skill in the art in possession of the present disclosure will recognize that the user device 300 may be provided by any of a variety of computing devices in the different examples discussed below. In the illustrated embodiment, the user device 300 includes a chassis 302 that houses the components of the user device 300, only some of which are illustrated in FIG. 3. For example, the chassis 302 may house a processing system (not illustrated) and a non-transitory memory system (not illustrated) that includes instructions that, when executed by the processing system, cause the processing system to provide an application engine 304 that is configured to perform the functions of the application engines and user devices discussed below. In a specific example, the application engine 304 is configured to provide a browser application 306, a native application 308, and a redirect engine 310, although one of skill in the art in possession of the present disclosure will recognize that other applications and computing device functionality may be enabled by the application engine 304 as well.

The chassis 302 may further house a communication engine 312 that is coupled to the application engine 304 (e.g., via a coupling between the communication engine 312 and the processing system). The communication engine 312 may include software or instructions that are stored on a computer-readable medium and that allow the user device 300 to send and receive information over the network 204. The chassis 302 may also house a storage system that includes an indicator database 314 that is coupled to the application engine 304 (e.g., via a coupling between the storage system and the processing system). The indicator database 314 may store one or more indicators that may be provided by the native application and that may indicate which native application features are enabled on the native application 308. While the indicator database 314 has been illustrated as housed in the chassis 302 of the user device 300, one of skill in the art will recognize that it may be connected to the application engine 304 through the network 204 without departing from the scope of the present disclosure.

Figure 4:
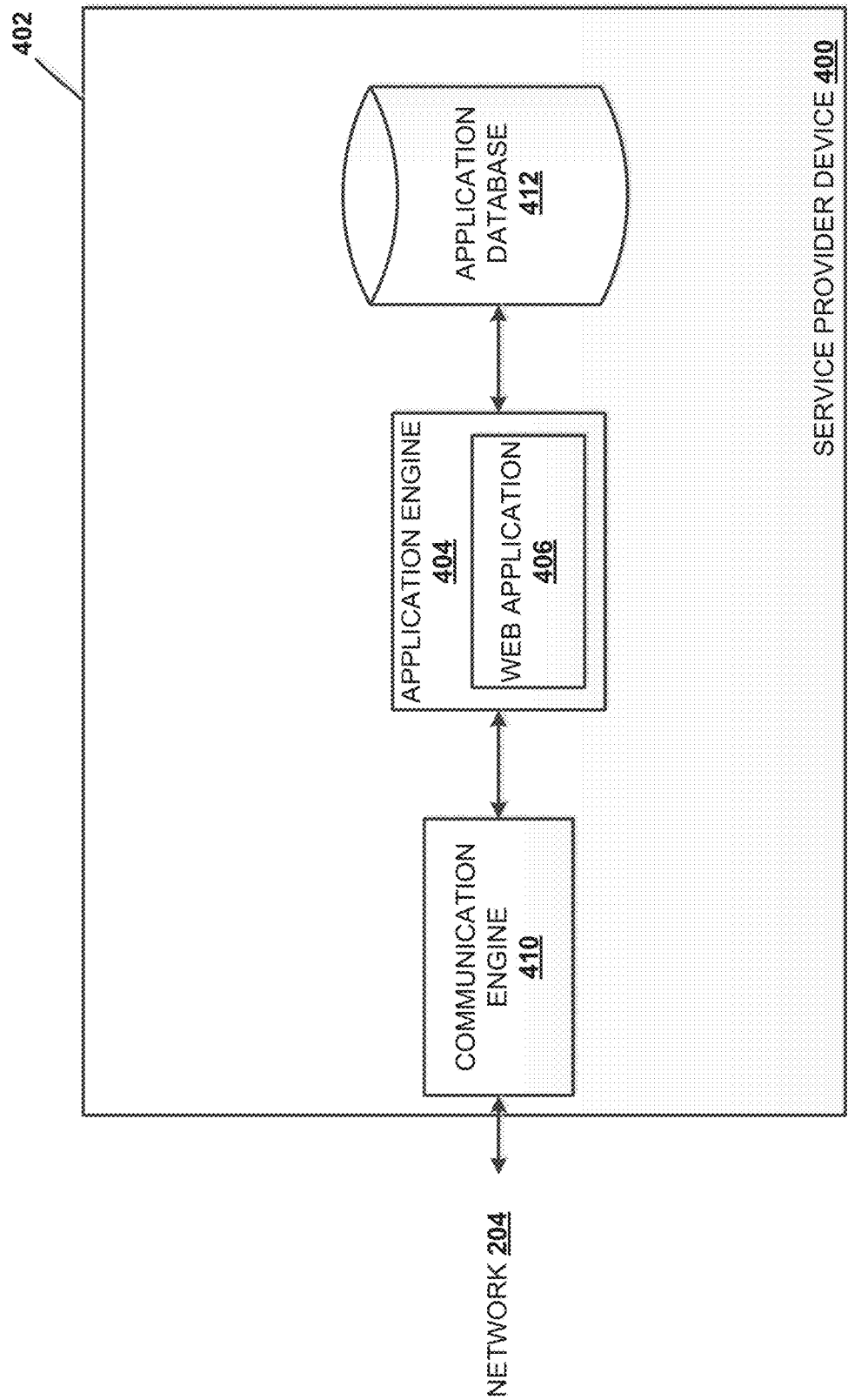
FIG. 4 is a schematic view illustrating an embodiment of a service provider device in the application redirection system of FIG. 2.

Referring now to FIG. 4, an embodiment of a service provider device 400 is illustrated that may be the service provider devices 206 and/or 208 discussed above with reference to FIG. 2, and which may be provided by one or more server devices. In a specific example, the service provider device 400 may be controlled by an on-line or mobile payment service provider such as, for example, PayPal, Inc. of San Jose, Calif. In the illustrated embodiment, the service provider device 400 includes a chassis 402 that houses the components of the service provider device 400, only some of which are illustrated in FIG. 4. For example, the chassis 402 may house a processing system (not illustrated) and a non-transitory memory system (not illustrated) that includes instructions that, when executed by the processing system, cause the processing system to provide an application engine 404 that is configured to perform the functions of the application engines and service provider devices discussed below. In a specific example, the application engine 404 is configured to provide a web application 406 discussed below, although one of skill in the art in possession of the present disclosure will recognize that other applications and computing device functionality may be enabled by the application engine 404 as well.

The chassis 402 may further house a communication engine 410 that is coupled to the application engine 404 (e.g., via a coupling between the communication system 410 and the processing system) and that is configured to provide for communication through the network 204 as detailed below. The chassis 402 may also house a storage system that includes an application database 412 that is coupled to the application engine 404 (e.g., via a coupling between the storage system and the processing system). The application database 412 may store web pages, images, videos, audio, other content, user profiles, user identifiers, user permissions, and/or other data used by the application engine 404 to provide services and perform the application redirection functionality discussed below. While the application database 412 has been illustrated as housed in the chassis 402 of the service provider device 400, one of skill in the art will recognize that the application database 412 may be connected to the application engine 404 through the network 204 without departing from the scope of the present disclosure.

Referring back to FIG. 1, the method 100 begins at block 102 where a request to perform at least one action through a first application controlling a process is received. In some embodiments, the service provider device 400 may receive a request to perform the at least one action through the web application 406 that is accessed through the browser application 306 of the user device 300. The web application 406 may be provided through a website, a mobile web application, and/or any other graphical user interface that may be provided to a browser known in the art. The process may include a series of steps that result in a completion of a workflow via a website such as navigating through various web pages to complete a task (e.g., purchasing a product or service, creating a user account, viewing media content, etc.). An action may be a command to perform a specific step or steps in the process such as, for example, a user of the user device 300 selecting a link on a website to navigate to a new web page, inputting information into a form, performing user authorization, and any other actions that would be apparent to one skilled in the art in possession of the present disclosure.

Figure 5:
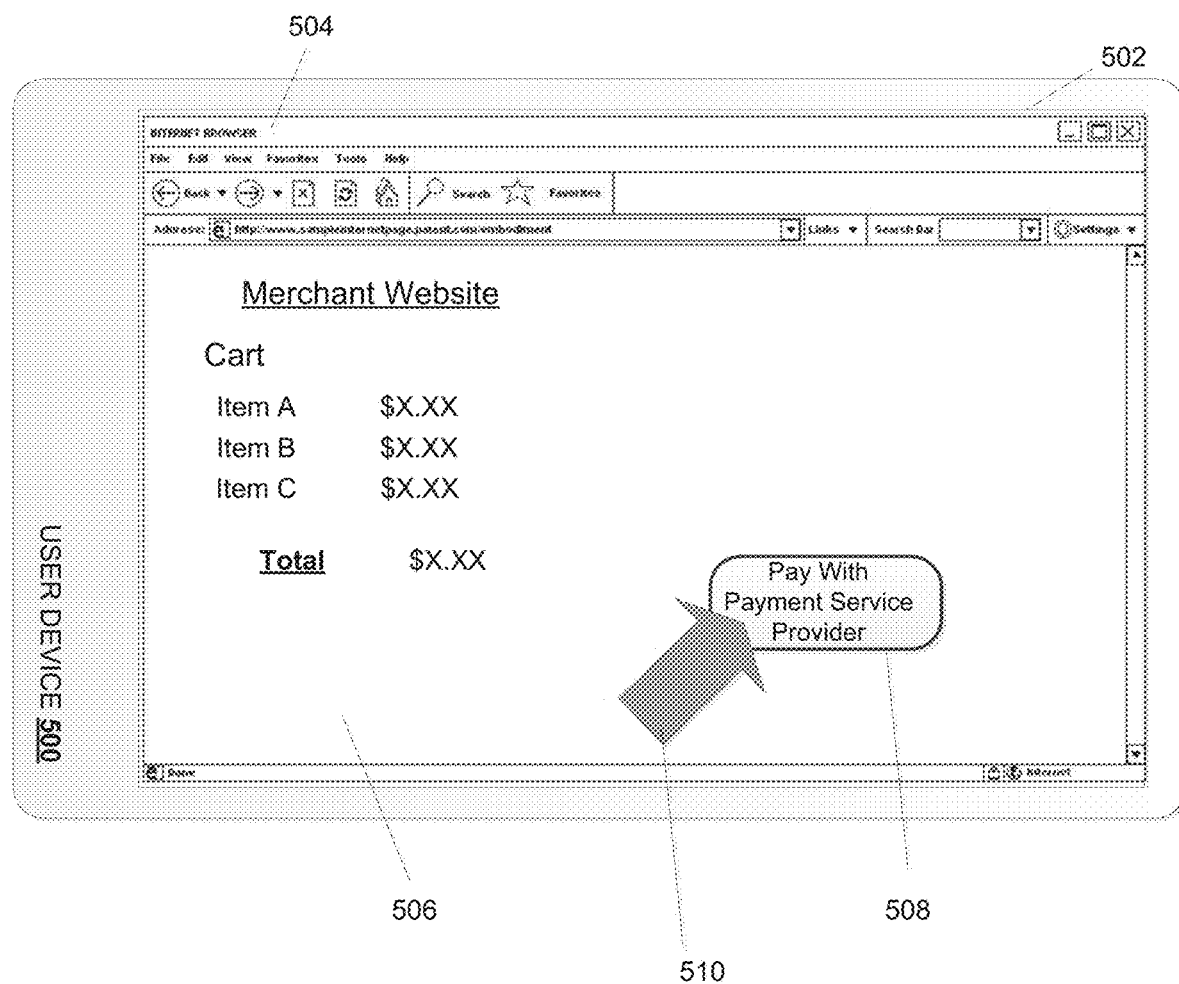
FIG. 5 is a screenshot of an embodiment of a user device displaying a merchant website in a browser application.

Referring now to FIGS. 5, 6, 7, 8, 9, and 10, screenshots of specific examples of the performance of method 100 are illustrated. Referring first to FIG. 5, a user device 500 that includes a display screen 502 is illustrated. The user device 500 may be any of the user devices 202/300 described above, and includes a browser application 504 that may be used to access a web application 506 provided by a service provider. In the specific example illustrated in FIG. 5, the web application 506 is a merchant website and the user has selected goods for purchase (e.g., Item A, Item B, and Item C). The web application 506 for purchasing goods may provide a process that requires one or more actions to complete the process. For example, the process may include authentication of a user accessing the merchant website, receiving selections of goods, receiving shipping information, receiving payment information, completing the purchase, providing a payment confirmation, and any other steps or sub-steps that would be apparent to one skilled in the art in possession of the present disclosure. In the specific example illustrated in FIG. 5, at checkout a user may select (as indicated by the arrow 510), a payment service provider button 508 to perform the transaction process to purchase the selected goods. The payment service provider button 508 may provide a link to a payment service hosted on a payment service provider system, and the selection of the payment service provider button 508 may provide a request to perform the at least one action through the web application controlling the process at block 102.

The method 100 then proceeds to block 104 where a determination is made whether the at least one action identifies a second application feature for completing the at least one action. In an embodiment of block 104, the web application 406 may be configured to determine whether the at least one action identifies a native application feature for completing the at least one action. Upon receiving the request to perform the at least one action, the web application 406 may determine whether the at least one action included in the request is an action that is preferably performed on the native application 308 using a native application feature. In different embodiments, the native application feature may or may not be different from a web application feature used to perform the same action. If the action is not preferably performed on the native application 308, or is preferably performed through the browser application 306 via the web application 406, then the method 100 may proceed with block 114 where the at least one action is completed with the first application feature of the first application (e.g., the web application feature of the web application 406).

In an embodiment, the web application 406 may determine whether the action is preferably performed using the native application feature based on the action itself. For example, a user authentication action may be preferably performed by the native application 308 rather than the web application if the native application is available. In some embodiments, the web application 406 may determine whether the action is preferably performed using the native application feature based on other factors such as, for example, information associated user device type, a browser type, and/or a version; user device capabilities; user preferences; and other factors that one of skill in the art in possession of the present disclosure would recognize would provide for action performance preference determinations between a web application feature and native application feature. In an embodiment, the request received at block 102 may include information about the user device and/or user information that the service provider device 400 may retrieve and utilize to determine the action performance preference between the native application 308 and web application 406. In a specific example of an action of data input, a native application configured with speech recognition algorithms, or that utilizes a speech recognition algorithm provided on the user device, may be preferred when the user device does not include a built in keyboard or provides a touchscreen keyboard. Likewise, when the user device 300 does include a built in keyboard in similar examples, the use of the web application 406 may be preferred to complete the action over the use of the native application 308. While a few examples of determining a preference between the use of the web application 406 and the use of the native application 308 to complete the at least one action have been described, different combinations of those examples are envisioned as falling within the scope of the present disclosure as well.

In response to identifying a second application feature for completing the at least one action, the method 100 then proceeds to block 106 where a determination is made as to whether the second application feature is enabled by the second application. In an embodiment of block 106, in response to determining that the native application feature is preferred over the web application feature to complete the at least one action, the web application 406 may determine whether the native application 308 associated with the native application feature is installed on the user device 300. If the native application 308 is installed on the user device 300, then the web application 406 may determine whether the native application feature is enabled at decision block 106.

In an embodiment, at decision block 106, the web application 406 may send instructions that request that the browser application 306 provide the web application 406 an indicator that is stored in the indicator database 314 and that is associated with the native application 308 that provides the native application feature that is configured to perform the at least one action. For example, the indicator may be a token stored in a cookie, an operating system (OS) level secured enclave, or a device level secured enclave, and/or any other indicator that can be accessed by both the browser application and native application. The indicator may include information such as an operating system (OS) installed the user device 300, an OS version, a name of the native application 308, a version of the native application 308, a device model, one or more native application features and their status (e.g., enabled or disabled), and any other information that would be apparent to one of skill in the art in possession of the present disclosure.

In an embodiment, prior to the method 100, the indicator may be provided to the browser application 306 so that the web application 406 knows that the native application 308 is installed, as well as the native application features that are enabled on the native application 308. In an embodiment, the indicator may be provided by the native application 308 to the browser application 306 when the native application 308 is installed on the user device 300. In some examples, installation of the native application 308 on the user device 300 may automatically enable native application features, and/or the native application 308 may receive instructions from a user to enable one or more native application features. The native application 308 may generate the indicator that may identify the native application features that are enabled on the native application 308 as well as any of the other information discussed above. The native application 308 may then provide the indicator to the browser application 306 for storage in the indicator database 314.

Figure 6:
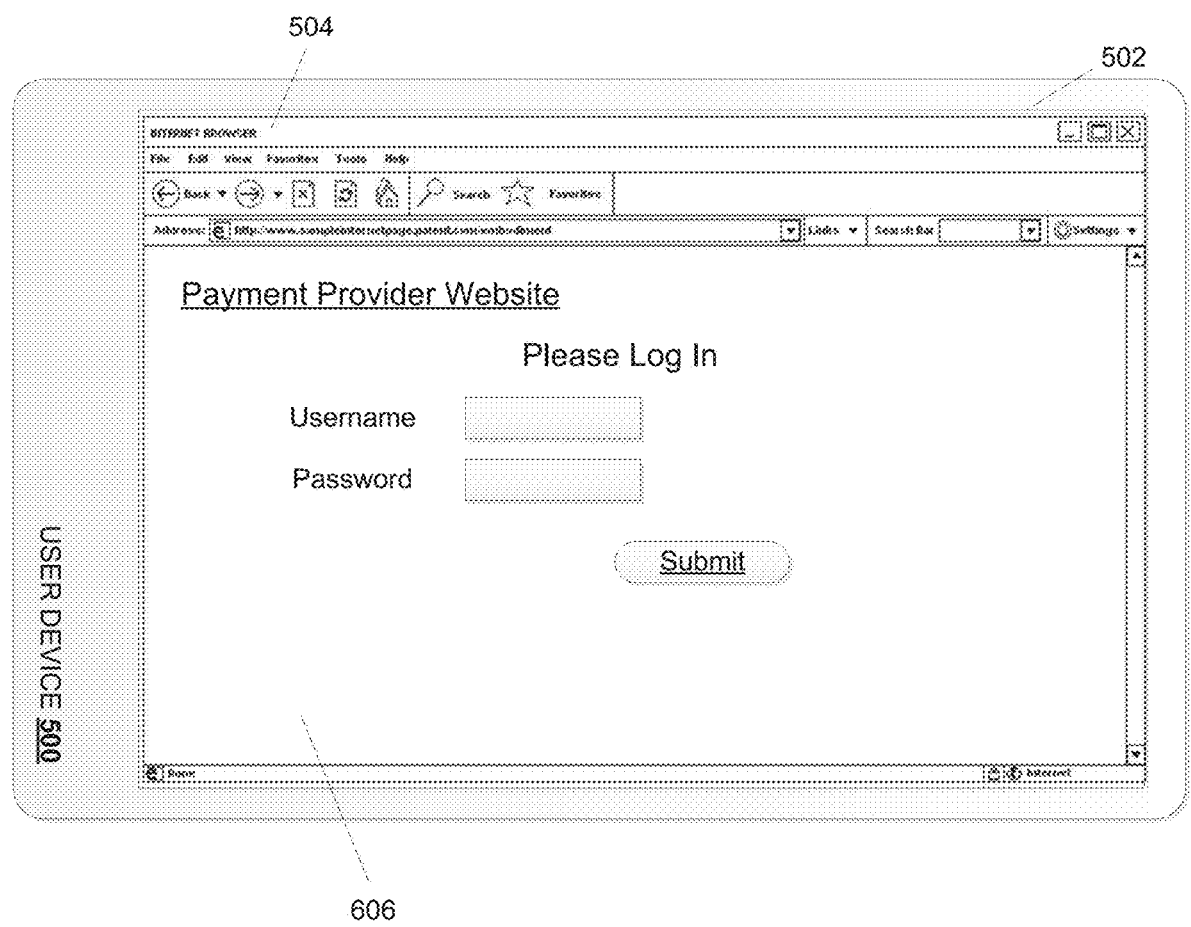
FIG. 6 is a screenshot of an embodiment of a user device displaying an authentication feature of a payment service provider web application in a browser application.
Figure 7:
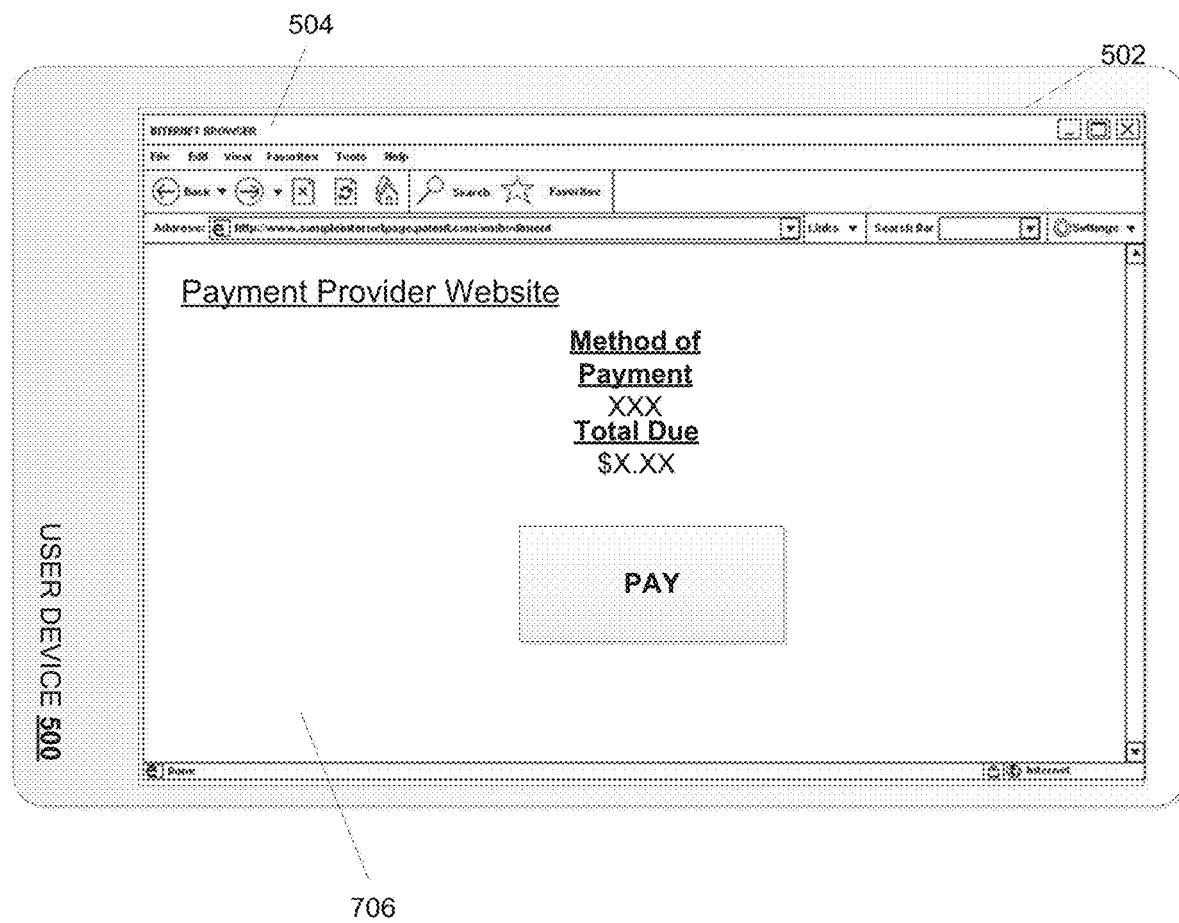
FIG. 7 is a screenshot of an embodiment of a user device displaying a payment feature of a payment service provider web application in a browser application.

In an embodiment, in response to the native application 308 not being installed on the user device 300, or in response to determining that the native application feature that is preferable over the web application feature for the at least one action is not enabled at block 106, the method 100 then proceeds to block 114 where the at least one action is completed with the second application feature. Referring now FIGS. 6 and 7, screenshots are provided to continue with the specific example discussed above with reference to FIG. 5 with respect to blocks 104, 106, and 114 of the method 100. In the specific example illustrated in FIG. 5, at checkout the user selected the payment service provider button 508 to complete the process for the transaction of the goods. The payment service provider button 508 may include a link that includes a uniform resource locator (URL) to a payment service provider web application hosted on by a payment website provided by a payment service provider system. Before the payment service provider web application provides the webpage that is associated with the URL, the payment service provider web application may perform block 104 of method 100 to determine whether the action requested is preferably performed with a web application feature or a native application feature. In the specific example, upon selecting the payment service provider button 508, the payment service provider web application may require an action of user authentication/authorization to access a user account to complete the transaction for the purchase of goods at the merchant website. The payment service provider web application may determine whether user authentication/authorization is preferably completed using a web application feature or a native application feature. If the payment service provider web application determines the action of user authentication/authorization is to be completed by the web application feature, then as illustrated in FIG. 6 and corresponding with block 114 of method 100, the payment service provider web application may provide a user authentication/authorization web page 606 for the user to input user credentials to access a user account managed by the payment service provider. After successful user authentication/authorization, the process may continue where the payment web application may provide a payment web page 706, as illustrated in FIG. 7, to the browser application 504 provided on the user device 500 to complete the transaction.

Similarly, at block 106 of method 100, if the payment service provider web application determines that the native application is not installed on the user device 500 or the native application feature that is preferable over the web application feature is not enabled, then as illustrated in FIG. 6 and corresponding with block 114 of method 100, the payment service provider web application may provide the user authentication/authorization web page 606 for the user to input user credentials to access a user account managed by the payment service provider. After successful user authentication/authorization, the process may continue such that the payment service provider web application may provide a payment web page 706, as illustrated in FIG. 7, to the browser application 504 of the user device 500 to complete the transaction and any other web pages to complete the process of purchasing the goods from the merchant website.

In response to determining that the second application is enabled at block 106 of method 100, the method 100 may proceed to block 108 where control of the process is redirected from the first application to the second application such that the second application completes the at least one action using the second application feature. In an embodiment, at block 108 control of the process may be redirected from the web application 406 to the native application 308 to complete the action. For example, the web application 406 may receive the request to perform an action that includes loading a web page based on a URL, and the web application 406 may generate a redirect URL (e.g., a 302 redirect) and provide the redirect URL to the user device 300 such that the redirect engine 310 receives the redirect URL. The redirect engine 310 may then process the redirect URL and determine which native application on the user device to switch control of the process should be redirected from the browser application 306. For example, the redirect engine 310 may reference a native application association database and use the redirect URL to determine a native application identifier that is stored in the native application association database in association with that redirect URL. Using the native application identifier, the redirect engine 310 may switch control of the process from the browser application 306 to the native application 308 that is associated with that native application identifier. The method then proceeds to block 110 where the second application completes the action with the second application feature.

For example, the service provider device 400 may host a native application association file (e.g., Apple®-app-site-association file (e.g., serviceprovider.com/apple-app-site-association.json)), such that when the service provider's domain (e.g., serviceprovider.com) is loaded for the first time on the browser application, the OS reads the native application association file and saves the native application file to indicate native application intent mapping at the OS level such that specific paths from the service provider domain are linked to the native application. When the native application associated with the service provider is installed for the first time on the user device, the OS checks if there is any related mapping and if there is, configures the redirect engine to monitor for the next time a service provider path that is mapped to a corresponding native application link. If such a path is accessed on the browser application, control of the process is switched from the browser application providing the web application to the native application. More specifically, the process described above of web application to native application linking may utilize specific instructions of iOS® (Safari® View Controller) or Android® (Chrome® Custom Tabs) to open an empty iframe to visit a deep app link to the service provider's native application for web application to native application redirection. The specific instructions may be Universal Links in iOS®, and App Linking in Android®.

Figure 8:
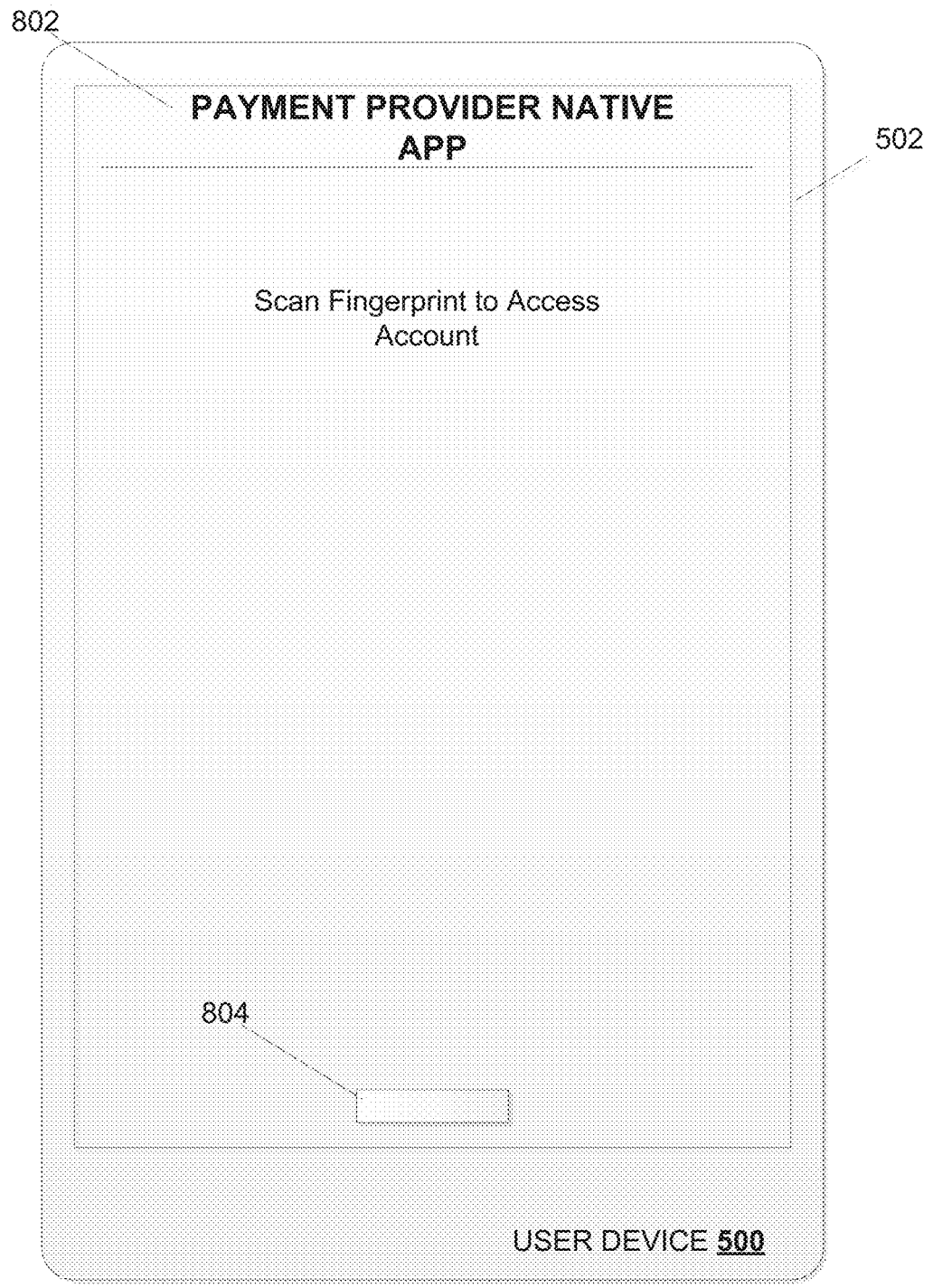
FIG. 8 is a screenshot of an embodiment of user device displaying an authentication feature of a payment service provider native application.
Figure 9:
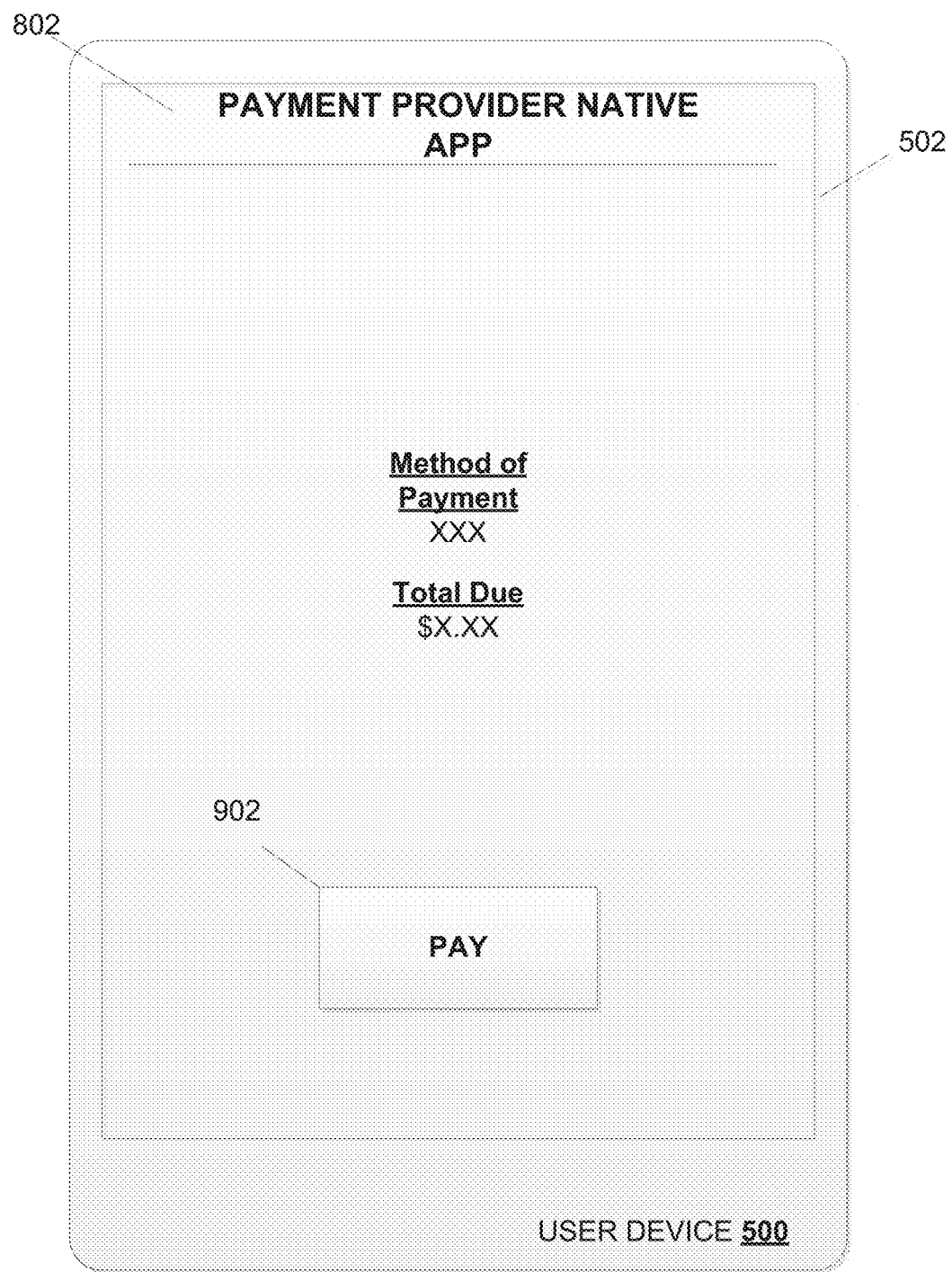
FIG. 9 is a screenshot of an embodiment of user device displaying a payment feature of a payment service provider native application.

Referring now to FIGS. 8 and 9, screenshots are provided that continue the specific example discussed above with reference to FIG. 5 to extend that discussion to blocks 108 and 110 of the method 100. As previously stated, the user may select the payment service provider button 508 on the merchant webpage 506, which may be a link to a URL that allows for the completion of a payment using a payment service provider service. The link may be for the payment service provider web application. For example, the payment service provider button 508 may provide the following link:

https://www.paymentserviceprovider.com/webapps/paymentserviceproviderweb application?token=EC-61X86723SG1002334, where EC-61X86723SG1002334 is a token that identifies the transaction. When the payment service provider web application receives this URL, the payment service provider web application will complete the steps associated with blocks 104 and 106 of method 100 to determine whether the request is associated with an action to be performed by a native application feature and whether the native application feature is enabled on the user device that is providing the request. When the native application feature is enabled on the user device, the payment service provider web application may then create a redirect URL. For example the redirect URL may include the following URL:

https://www.paymentserviceprovider.com/mobile/checkout?&token=EC-61X86723SG1002334&x-source=web&x-success=http%3A%2F%2Fxotoolslvs01.qa.paymentserviceprovider.com%2Fectest%2Freturn.html&x-cancel=http%3A%2F%2Fxotoolslvs01.qa.paymentserviceprovider.com%2Fectest%2Fcancel.html.

In specific examples, this redirect URL may include a plurality of query parameters such as: (1) token=EC token, (2) x-source=web (this is used to identify the payment service provider web application), (3) x-success=http%3A%2F%2Fxotoolslvs01.qa.paymentserviceprovider.com%2Fectest%2Freturn.html (this is the success URL to return to after successful completion of the payment with the native application), and (4) x-cancel=http%3A%2F%2Fxotoolslvs01.qa.paymentserviceprovider.com%2Fectest%2Fcancel.html (e.g., the cancel URL for the native application to return to if the user cancels the payment from the native application).

The payment service provider web application may send the redirect URL to the user device, and the user device operating system may include a redirect engine that may process the redirect URL. For example, the "/mobile/checkout" path of the redirect URL may indicate to the redirect engine to reference a native application association file stored in a database and retrieve a native application identifier that may be used to determine whether a matching native application identifier associated with the payment service provider's native application is present on the user device 500, which may indicate that the payment service provider's native application is installed on the user device. The redirect engine may then activate the native application to allow the native application to complete the requested action associated with the selection of the payment service provider button 508.

As illustrated in FIGS. 5 and 8, if the user selects the payment service provider button 508 and the native application feature is enabled, the user may then be redirected to a payment service provider native application 802 to complete the action associated with selecting the payment service provider button 508. In a specific example, the action may include completing user authentication using a native application feature provided by the native application 802. As illustrated in FIG. 8, the user authentication may be completed with a native application feature that may be able to authenticate a user (e.g., to provide access to the user's payment service provider account) with biometrics such as scanning the user's fingerprint with a fingerprint scanner 804. The user may complete the action of user authorization by scanning their fingerprint, which upon authentication allows access to the user's payment service provider account. As illustrated by the screenshot in FIG. 9, after successful authorization the process may continue with an action of payment selection and confirmation via the native application 802. The user may then complete the payment using a payment native application feature of the payment service provider native application 802 by selecting the method of payment and selecting the "Pay" button 902 to complete the transaction. As discussed above, the native application feature of biometric authorization may be a preferred feature over providing user credentials into the form of the web application feature illustrated in FIG. 6.

The method 100 then proceeds to block 112 where the control of the process is redirected from the second application to the first application after the second application has completed the at least one action. In an embodiment of block 112, the native application 308 may complete the at least one action and redirect the process back to the web application 406 accessed via the browser application 306. For example, the redirect URL may include one or more URLs for which the native application monitors such as, for example, a success URL, a fail URL, a cancel URL, and/or any other URL that indicates to the native application 308 to stop performing the process and signals the redirect engine 310 to redirect the process back to the web application 406 accessed via the browser application 306. The web application 406 may then perform any remaining actions of the process.

Figure 10:
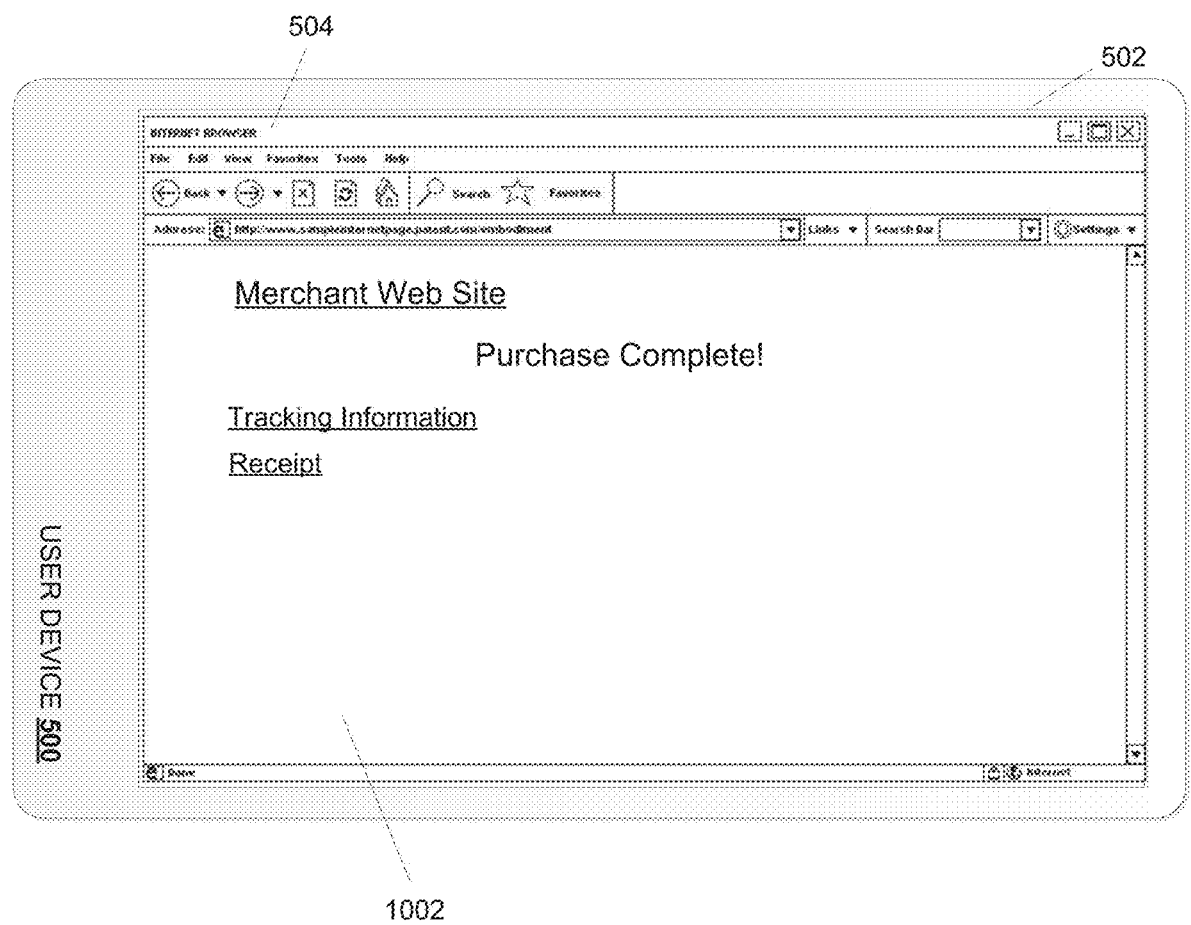
FIG. 10 is a screen shot of an embodiment of a user device displaying a merchant web application in a browser application after payment is completed for goods or services using a payment service provider.

Continuing with the specific example illustrated in FIGS. 5, 6, 7, 8, 9, and 10, as illustrated in FIG. 8, the user may complete the user authorization action with a fingerprint scan. If the fingerprint scan is a success, the following redirect URL may be provided:

https://www.paymentserviceprovider.com/mobile/
checkout?&token=EC-61X86723SG1002334&x-
source=web&x-
success=http%3A%2F%2Fxotoolslvs01. qa.
paymentserviceprovider.com%2Fectest%2Freturn.
html&x-cancel=http%3A%
2F%2Fxotoolslvs01.qa.paymentserviceprovider.com%
2Fectest%2Fcancel.html, The redirect URL above may cause the native application 802 to redirect the process back to the payment service provider web application in the browser application 504 to complete the payment as illustrated in FIG. 7. In another example, the redirect URL may indicate the completion of a different action besides user authorization and may redirect the process from the payment service provider native application to the payment service provider web application in the browser application 504. For example, after completion of user authorization in FIG. 8, the process may continue with the payment action in the native application 802, as illustrated and discussed above with reference to FIG. 9. The completion of the payment action in FIG. 9 may then trigger the URL that indicates to the native application 802 to return the process to the payment service provider web application in the browser application 504. As illustrated in the screenshot of FIG. 10, the process may return to a merchant web page 1002 that is provided by the merchant web application in the browser application 504 when the payment action is a success, which may allow for tracking and for the provisioning of a receipt of the completed purchase. In an embodiment, the redirect engine may cause the web page 1002 that was requested by the URL to load in the same browser application view (e.g., same tab and/or same window) and to replace the web page 506 illustrated in FIG. 5 or a new browser view. While specific examples of returning to the web application from the native application have been illustrated, one of skill in the art in possession of the present disclosure will recognize redirection of a process between a web application and a native application may be performed in a variety of manners without departing from the scope of the present disclosure.

Thus systems and methods have been described that provide for the redirection of control of a process between a first application and a second application on a user device. The application redirection systems and methods provide for actions of a process begun on a web application via a browser application to be completed using a native application that may have one or more native application features for completing the action that are preferred over web application features that can complete the same action. Redirecting control of a process between the web application and the native application to complete an action may enhance the user's experience by providing access to particular application features available on one of the web application and the native application that are preferable in that they may be faster, more secure, more user friendly than the corresponding application features on the other application. The application redirection systems and methods also provide for a seamless redirection of control between the web application and native application such that the system does not require any direct inputs from the user to perform the redirection process.

Figure 11:
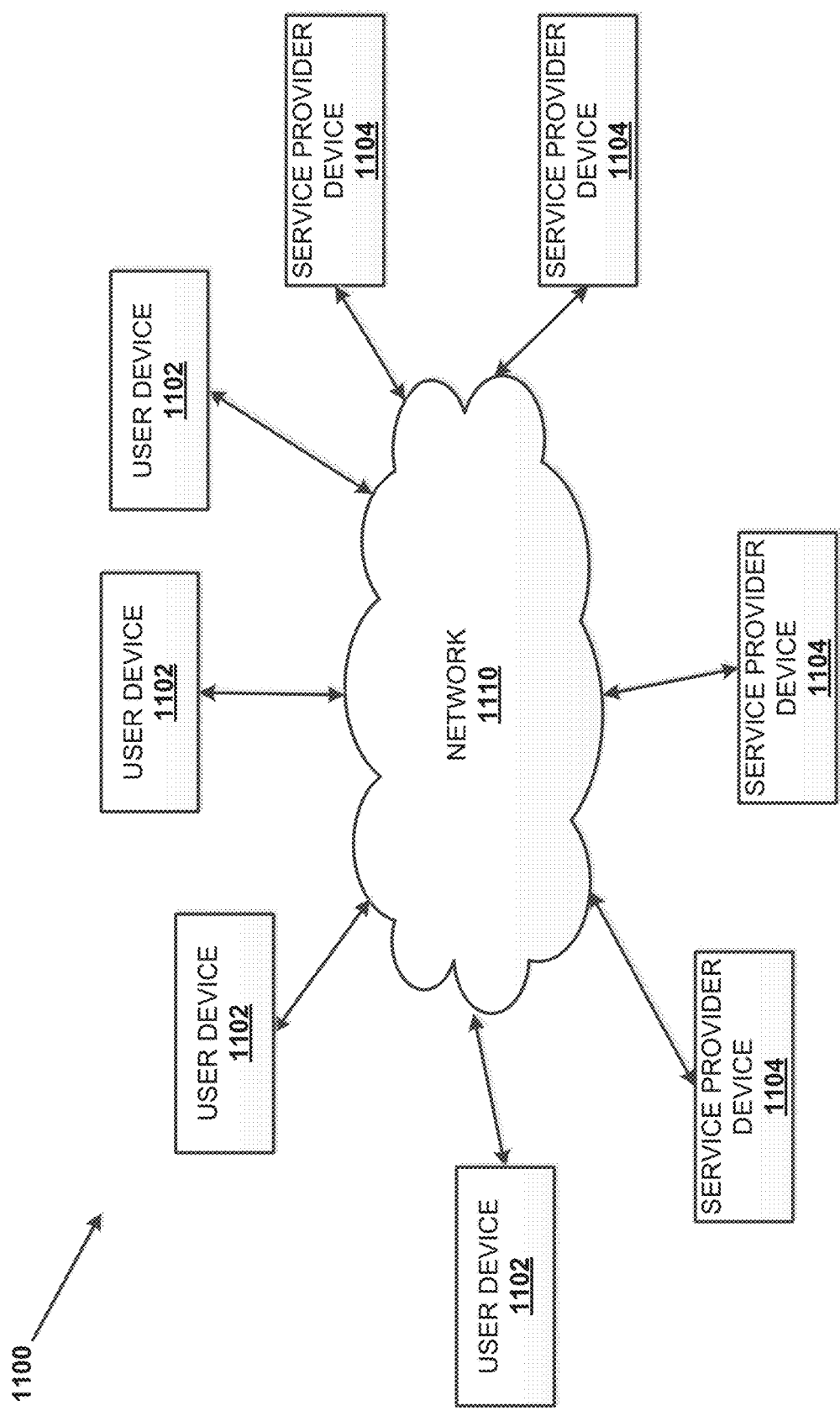
FIG. 11 is a schematic view illustrating an embodiment of a networked system.

Referring now to FIG. 11, an embodiment of a network-based system 1100 for implementing one or more processes described herein is illustrated. As shown, network-based system 1100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 11 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of a networked system 1100 illustrated in FIG. 11 includes a plurality of user devices 1102, and a plurality of service provider devices in communication over a network 1110. Any of the user devices 1102 may be any of the user devices discussed above and operated by the users discussed above. The service provider devices 1106 may be any of the service provider devices discussed above and may be operated by a payment service provider such as, for example, PayPal Inc. of San Jose, Calif.

The user devices 1102 and the service provider devices 1104 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1110.

The network 1110 may be implemented as a single network or a combination of multiple networks. For example, in various embodiments, the network 1110 may include the Internet and/or one or more intranets, landline networks, wireless networks, and/or other appropriate types of networks.

The user device 1102 may be implemented using any appropriate combination of hardware and/or software configured for wired and/or wireless communication over network 1110. For example, in one embodiment, the user device 1102 may be implemented as a personal computer of a user in communication with the Internet. In other embodiments, the user device 1102 may be a smart phone, personal digital assistant (PDA), laptop computer, and/or other types of computing devices.

The user device 1102 may include one or more browser applications which may be used, for example, to provide a convenient interface to permit the user to browse information available over the network 1110. For example, in one embodiment, the browser application may be implemented as a web browser application configured to view information available over the Internet.

The user device 1102 may also include one or more toolbar applications which may be used, for example, to provide user-side processing for performing desired tasks in response to operations selected by the user. In one embodiment, the toolbar application may display a user interface in connection with the browser application.

The user device 1102 may further include other native applications as may be desired in particular embodiments to provide desired features to the user device 1102. In particular, the other applications may include a payment application for payments assisted by a payment service provider through the service provider device 1104. The other applications may also include security applications for implementing user-side security features, programmatic user applications for interfacing with appropriate application programming interfaces (APIs) over the network 1110, or other types of applications. Email and/or text applications may also be included, which allow the user to send and receive emails and/or text messages through the network 1110. The user device 1102 includes one or more user and/or device identifiers which may be implemented, for example, as operating system registry entries, cookies associated with the browser application, identifiers associated with hardware of the user device 1102, or other appropriate identifiers, such as a phone number. In one embodiment, the user identifier may be used by the voice-controlled devices 1104, the service provider device 1106 and/or the networking devices 1108 to associate the user with a particular user profile as further described herein.

Figure 12:
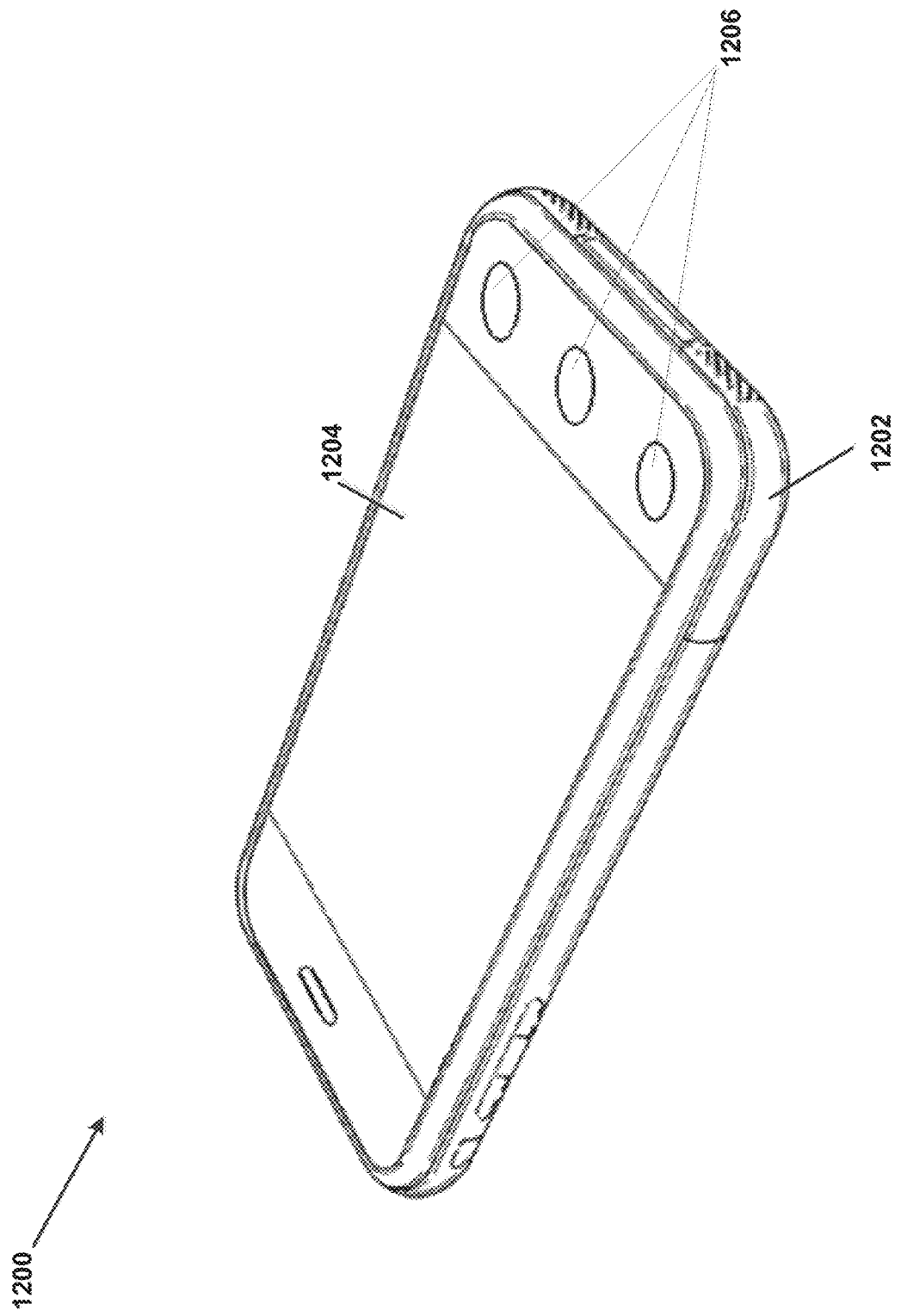
FIG. 12 is a perspective view illustrating an embodiment of a user device.

Referring now to FIG. 12, an embodiment of a user device 1200 is illustrated. The user device 1200 may be the user devices 202, 300, 500, and/or 1102. The user device 1200 includes a chassis 1202 having a display 1204 and an input device including the display 1204 and a plurality of input buttons 1206. One of skill in the art will recognize that the user device 1200 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 13:
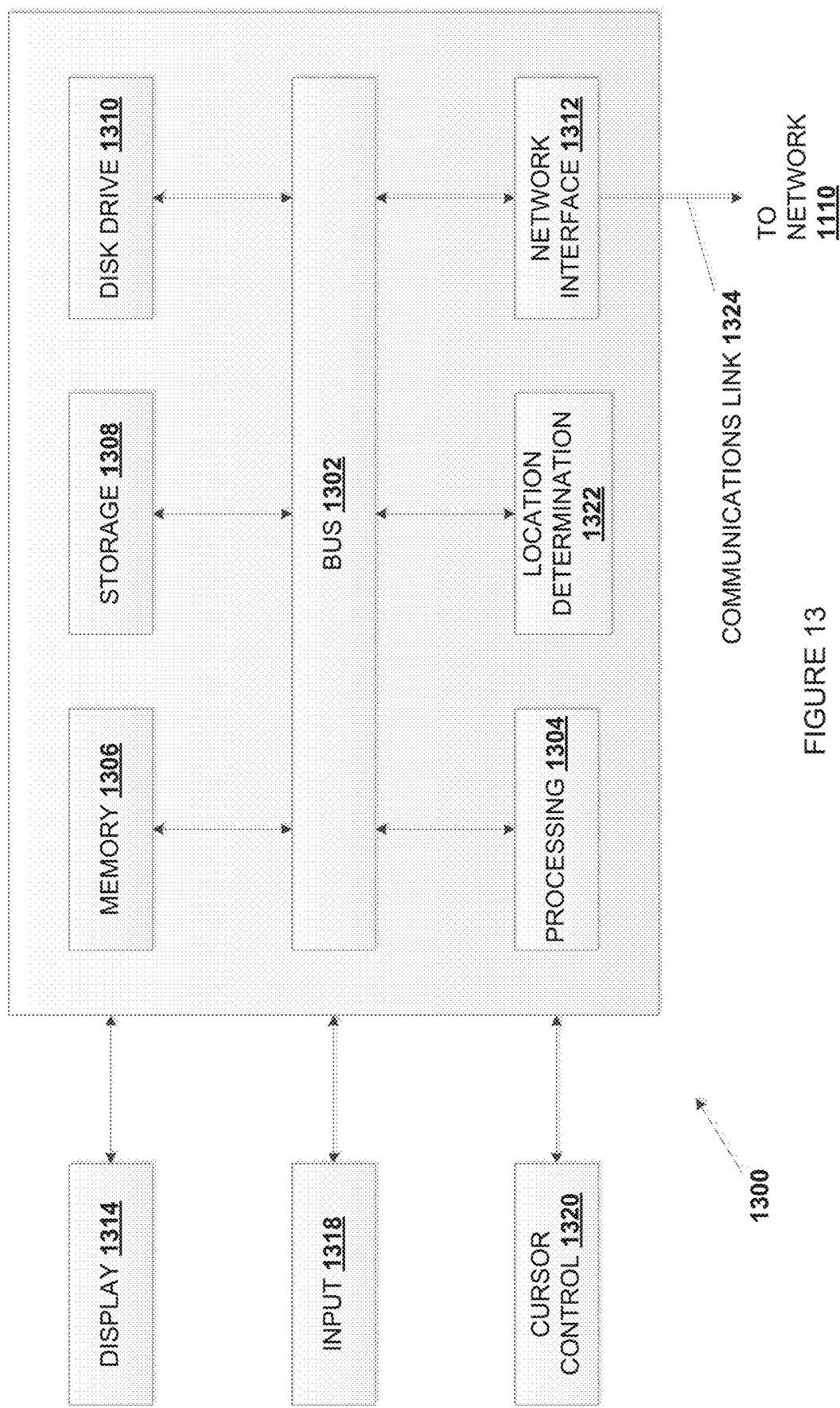
FIG. 13 is a schematic view illustrating an embodiment of a computer system.

Referring now to FIG. 13, an embodiment of a computer system 1300 suitable for implementing, for example, the user devices 202, 300, 500, 1102, 1200 and the service provider devices 206, 208, 400, and/or 1104, is illustrated. It should be appreciated that other devices utilized by users, and service providers in the browser application to native application redirection system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), and/or a location determination component 1322 (e.g., a Global Positioning System (GPS) device as illustrated, a cell tower triangulation device, and/or a variety of other location determination devices known in the art.) In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user devices and service provider devices. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device, comprising:
a processor; and
a memory having stored thereon instructions that are executable by the processor to cause the mobile device to perform operations comprising:
detecting a request made by a user to perform an action within a first program running on the mobile device, wherein the first program is configured to display Internet content to the user;
determining that the action requires an authorization of the user to complete the action;
checking, by the first program, an indicator accessible to the first program, the indicator indicating whether a second program on the mobile device is capable of performing the authorization outside of the first program, wherein the indicator becomes accessible to the first program when the second program is installed on the mobile device;
causing the second program to display, to the user, a user interface that is configured to prompt the user to take one or more steps to complete the authorization; and
responsive to the user completing the authorization via the second program, facilitating completion of the action from within the first program running on the mobile device.

2. The mobile device of claim 1, wherein the operations further comprise:
displaying information indicating to the user that the second program will complete the action.

3. The mobile device of claim 1, wherein the second program corresponds to an online service provider that completes the action, and wherein the first program does not correspond to the online service provider.

4. The mobile device of claim 1, wherein the first program is a mobile web browser.

5. The mobile device of claim 1, wherein the action is an electronic transaction initiated by the user to make an online purchase.

6. A method, comprising:
detecting, at a mobile device, a request made by a user to perform an action within a first program running on the mobile device, wherein the first program is configured to display Internet content to the user;
determining that the action requires an authorization of the user to complete the action;
based on information indicating that a second program on the mobile device is capable of performing the authorization outside of the first program, causing the second program to display a user interface that is configured to receive one or more steps from the user to complete the authorization, wherein the information is an indicator associated with the first program that becomes accessible to the first program when the second program is installed on the mobile device; and responsive to the user completing the authorization via the second program, facilitating completion of the action from within the first program running on the mobile device.

7. The method of claim 6, wherein the one or more steps to complete the authorization include receiving a biometric at an interface of the mobile device.

8. The method of claim 7, wherein the first program is not configured to allow access to a biometric sensor of the mobile device, but the second program is configured to allow access to the biometric sensor.

9. The method of claim 7, wherein the biometric includes a fingerprint of the user.

10. The method of claim 6, wherein the authorization is for accessing an account of the user.

11. The method of claim 10, wherein the account is an online account accessible via multiple different computing devices, including the mobile device.

12. The method of claim 6, wherein facilitating completion of the action from within the first program includes displaying additional content within the first program, the additional content providing the user with one or more user interface elements configured to receive user input for completing an electronic purchase.

13. The method of claim 12, wherein the additional content includes a transaction confirmation web page and wherein the one or more user interface elements include a purchase button selectable by the user.

14. The method of claim 6, wherein causing the second program to display the user interface is based on a web application executing within the first program a redirection URL to the mobile device.

15. The method of claim 14, further comprising:
processing, the redirection URL by a redirection engine executing on the mobile device, wherein the processing opens the second program on the mobile device.

16. The method of claim 6, wherein the user interface is configured to prompt the user to take the one or more steps to complete the authorization by requesting that the user logs into an account of the user.

17. A non-transitory computer-readable medium having stored thereon instructions that are executable by a mobile device having a processor and a memory to cause the mobile device to perform operations comprising:

detecting a request made by a user to perform an action within a first program running on the mobile device, wherein the first program is configured to display Internet content;

responsive to the action requiring an authorization of the user to complete the action, accessing, by the first program, an indicator indicating whether a second program on the mobile device is capable of performing the authorization outside of the first program, wherein the indicator becomes accessible to the first program when the second program is installed on the mobile device;

causing the second program to display a user interface that is configured to prompt the user to take one or more steps to complete the authorization; and responsive to the user completing the authorization via the second program, facilitating completion of the action from within the first program running on the mobile device.

18. The non-transitory computer-readable medium of claim 17, wherein the first program is a mobile web browser.

19. The non-transitory computer-readable medium of claim 17, wherein the first program is not configured to allow access to a biometric sensor of the mobile device, but the second program is configured to allow access to the biometric sensor.

20. The non-transitory computer-readable medium of claim 17, wherein causing the second program to display the user interface is based on a web application executing within the first program providing a redirection URL to the mobile device.

* * * * *